United States Patent [19]

Metz et al.

[11] 3,722,265
[45] Mar. 27, 1973

[54] ENGINE PERFORMANCE COMPUTING ARRANGEMENT

[75] Inventors: Thomas R. Metz; Eugene F. Holben, both of Haddonfield, N.J.

[73] Assignee: Conoflow Corporation, Blenheim, N.J.

[22] Filed: Mar. 15, 1971

[21] Appl. No.: 124,098

[52] U.S. Cl...................................73/117.3, 73/133
[51] Int. Cl..............................................G01m 15/00
[58] Field of Search ..73/113, 114, 117.3; 235/150.2, 235/150.21

[56] References Cited

UNITED STATES PATENTS

| 3,046,528 | 7/1962 | Rowe et al.........................235/150 X |
| 3,118,302 | 1/1964 | Fathauer................................73/114 |
| 3,589,176 | 6/1971 | Wellons..................................73/113 |

FOREIGN PATENTS OR APPLICATIONS

| 684,002 | 4/1964 | Canada..................................73/114 |

Primary Examiner—Jerry W. Myracle
Attorney—C. Cornell Remsen, Jr., Walter J. Baum, Paul W. Hemminger, Charles L. Johnson, Jr., Philip M. Bolton, Isidore Togut, Edward Goldberg, Menotti J. Lombardi, Jr. and H. Edward Foerch

[57] ABSTRACT

A computing arrangement is described in which the fuel horsepower of an engine under test is calculated and displayed. A programmable network generates a pulse output when a preselected RPM is reached by the engine under test. A control means in response to the output pulse permits time clocking pulses to be applied to a register to sense the time required for a predetermined number of fuel input pulses to be generated. A fuel consumption meter counting means is coupled to sense the predetermined number of fuel input pulses, and a storage means stores the total time required to sense the fuel pulses. A programmed calculating arrangement is coupled to the storage means and programmed for computing the fuel horsepower of the engine and to display in a digital readout the results of the calculation.

26 Claims, 6 Drawing Figures

ENGINE PERFORMANCE COMPUTING ARRANGEMENT

BACKGROUND OF THE INVENTION

The invention relates to an improved system and method for computing engine performance, and in particular to an improved system and method for calculating fuel consumption at a predetermined load and displaying the results of the computation.

In known fuel consumption measuring instruments for indicating the fuel consumption of vehicles, there is generally provided a first signal generator for generating a signal having a magnitude proportional to the velocity of the vehicle. Another signal generator is usually provided for generating space pulses, the duration of the pulses and interval between the pulses being inversely proportional to the quantity of fuel per unit time being consumed by the vehicle. A means for integrating and retaining the signal from the first generator is provided and controlled by a switching arrangement which is responsive to the pulse signals from said other signal generator. A measuring means to sample the stored signal retained to provide an indication of fuel consumed by the vehicle. The arrangement is usually controlled in a progressive cycle which includes a charging period during which the signal from the first generator is stored, and a discharging period during which the stored signal is obtained, and a period during which the stored signal is connected to a measuring means for indicating the fuel consumption.

A tachometer, in such a known gas consumption measuring instrument, generates a pulse signal, the frequency of which is proportional to the velocity of the vehicle and from which is derived an electric voltage, which varies in magnitude with the pulse frequency. The voltage derived from the pulse frequency of a fuel meter transmitter is coupled either to an operational amplifier, the amplification of which is varied by the signal for the fuel meter transmitter, or into a circuit arrangement the resistance of which is varied by the transmitter. The output of the signal amplifier, or the current in the circuit, may be read directly on an ampere meter which may be calibrated in miles per gallon. These known type arrangements, contrary to the system and method of the invention, have limited applications due to degree of analysis possible, and speed and accuracy of the results.

SUMMARY OF THE INVENTION

It is therefore an object of the invention to provide an improved system and method for computing engine performance.

Another object of this invention is to provide a computing arrangement and method for determining the fuel horsepower of an engine at a predetermined load condition. A further object of the invention is to provide a programmable computing arrangement and method for indicating the fuel horsepower of an engine at a preselected RPM.

According to the broader aspects of the invention there is provided a computing system for an engine under test in which a first pulse is generated to indicate the selected RPM of said engine, a second pulse is generated to indicate a predetermined number of fuel consumption pulses, means responsive to said first and second pulse is coupled to cause registering and storing of the time to accumulate the fuel pulses, and programmed means is coupled in the system to calculate and indicate the fuel consumption of the engine.

According to a feature of the invention, a computing arrangement comprises a programmable network to generate an output pulse when a set engine RPM is reached, a control means responsive to said output pulse to allow timing clock pulses to be applied to a totalizing register, fuel meter counting means is coupled to sense a predetermined number of fuel consumption pulses and to inhibit further timing clock pulses to the totalizing register, storage means coupled to the register stores the time required to sense the predetermined number of fuel input pulses, calculating means is coupled to the register and storage means and programmed to compute the fuel horsepower of the engine, and decoding and display means are coupled to the storage means to directly indicate the results of the computation.

According to the inventive method for determining the fuel horsepower of an engine, the method comprises the steps of selecting a desired RPM at which the engine is to be tested, indicating when the selected RPM is reached, counting a predetermined number of fuel consumption pulses, totalizing and storing the time required to accumulate said fuel pulses, and utilizing the stored time to calculate the fuel horsepower of the engine.

A further feature of the inventive method includes the steps of programming a meter factor number into said calculation, and programming a number into said calculation representing the engine factor of the engine under test.

BRIEF DESCRIPTION OF THE DRAWINGS

The foregoing and other objects and features of the invention will be more fully understood and appreciated upon consideration of the following detailed description of a system organized in accordance therewith, the description being intended to be read in conjunction with the accompanying drawings, in which.

DESCRIPTION OF THE PREFERRED EMBODIMENT

Figure 1:
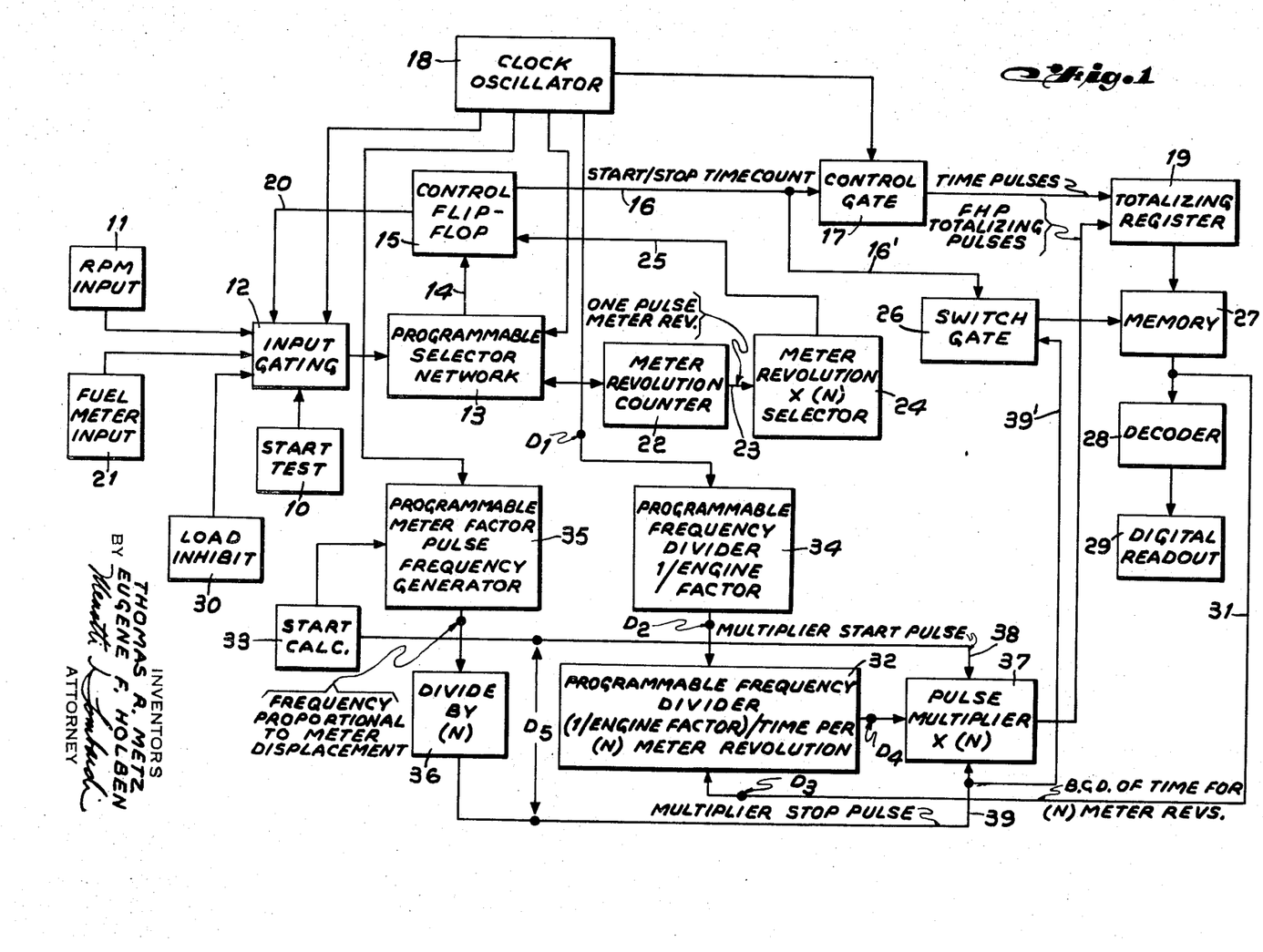
FIG. 1 is a functional block diagram of an engine performance computing arrangement according to the invention.

Referring now to FIG. 1, a functional block diagram of an engine performance computing arrangement according to the invention is illustrated. The computing arrangement is initialized so that all memory, counting, and logic elements are set to their zero state. Prior to operation, predetermined data is programmed into the arrangement by means of RPM selector switches, meter revolution selector switches, meter factor switches, and selector switches for the engine factor. The calculation of the fuel horsepower from these factors is determined by the arrangement by solving the following formula:

$$\text{fuel (brake) horsepower} = \frac{\text{meter factor} \times (N) \text{ revolutions}}{\text{engine factor} \times \text{time per revolutions} \times (N) \text{ revolutions}}$$

where engine factor is equal to pounds of fuel per brake horsepower hour, and the meter factor is equal to pounds per gallon times gallons per revolution times seconds per hour.

After the proper switch settings have been made, and the arrangement initialized 10, RPM (pulse frequency) input pulses from an engine tachometer 11 are coupled by input gating means 12 to a programmable selector network 13 which counts RPM pulses. The network 13 generates a pulse output on lines 14 when the desired engine RPM is reached. This pulse output triggers control flip-flop 15 which opens by line 16 control gate 17. Gate 17 allows clock timing pulses from oscillator 18, for the following example at the rate of 100 Hertz, to be applied to a totalizing register 19. At the same time of the start time count, control flip-flop 15 also switches, by line 20, gating means 12 to enable pulses from a fuel meter input 21 to be coupled through the input gating to a counting portion of the programmable selector network 13 which now counts fuel pulses. A meter revolution counter means 22 is coupled to sense when the count has reached a predetermined number of fuel input pulses.

The fuel (pulse frequency) input pulses may be derived from a digital flow meter, such a meter has a pulse disc which measures the volumetric flow rate of liquids and produces a predetermined number of output pulses per revolution of the disc. Meters of this type are marketed by Conoflow Corporation, Blackwood, N.J. Two types are: Model Dp-31-1448 having a flow rate of 0.30–6.0 gallons per hour, and Model DP-40-1449 having a flow rate of 4.0–80.0 gallons per hour, these types produce 720 output pulses per revolution of the disc.

Since there are 720 pulses per 1 meter revolution of the flow meter, according to the example, the counter 22 is set to sense 720 fuel input pulses.

Once 720 pulses have been counted, there is generated on line 23 a single meter pulse to indicate that one meter revolution has been completed. This generated meter pulse is applied to a meter revolution times (N) selector 24. If the selector has previously been set for one revolution, an inhibit pulse is generated on line 25 to switch flip-flop 15 and thereby on line 16 inhibit the control gate 17 to prevent further entry of the time pulses into the time totalizing register 19. If the meter revolution times selector switch had been set for another number, i.e., two, three, four, etc., an inhibit pulse would have been generated only when a comparable number of meter revolutions had been completed.

The stop time count pulse also by line 16' activates switch gate 26 to latch memory 27. The results of this operation is that the time accumulated in register 19 and continuously fed to the memory are now stored in said memory. The number stored in the memory 27 is the time in seconds that was required for one or more meter revolutions. This number is stored and the BCD output of this number is also decoded in the following coupled decoder 28 and displayed in a digital readout indicator 29. This first digital readout represents time in hundredths of a second.

It should be noted that one of the initial conditions which may be established for running this test is to make sure that the engine test is at the desired load. One way is to use a rack switch which must remain closed or not open for the time to record a test at the set RPM. This switch is connected to a sensor within circuit 30, and if the switch is open for more than a predetermined time, a pulse will be generated to inhibit and indicate that the conditions have not been met, and the test will have to be rerun.

The binary coded decimal signal ($D_3$) of the stored time is also coupled by line 31 to a programmable frequency divider 32 and used during calculation of the fuel horsepower. The calculation of fuel horsepower according to the disclosed embodiment is now accomplished by initiating, manually or automatically, the start calculate means 33. This enables, in the following example, a 10 mega-hertz clock signal ($D_1$) from the oscillator 18 to be coupled to a programmable frequency divider means 34. The divider 34 divides the 10 megahertz signal by the engine factor that was previously programmed into this divider by a plurality of switches, as shown and described in connection with FIG. 2. The signal output ($D_2$) from divider 34 is a frequency signal whose frequency is equivalent to 10 mega-hertz divided by the set engine factor for the particular engine under test. The signal ($D_2$) is then applied to the programmable frequency divider 32 to divide it by the signal ($D_3$) coupled from the memory register 27.

In conjunction with the operation of divider 32, a programmable meter factor pulse frequency generator 35 receives clock pulses from oscillator 18 to produce a frequency signal output which is proportional to the fuel meter displacement. The meter factor programmed depends on the meter used and represents the volumetric displacement as previously defined. The meter frequency displacement pulses are coupled to a divide by (N) network 36 which is set for the same (N) that was previously used in selector 24. The output of network 36 controls a pulse multiplier X (N), block 37, which was initiated by the start calculate means 33 to couple the pulses ($D_4$) to register 19. The multiplier 37 will remain open for one period ($D_5$) dependent on the frequency generated by the meter factor generator 35. The indicated period ($D_5$) is determined from the multiplier start pulse on line 38 to the stop pulse on line 39 for the multiplier.

The pulses ($D_4$) that are coupled through the pulse multiplier 37 are therefore equivalent to the fuel horsepower and are applied to register 19 which now acts as a fuel horsepower totalizing register. The memory 27 is updated from register 19 when the multiplier stop pulse, on line 39', through gate 26 latches the reading in the memory. The new data stored in the memory is equivalent to the fuel horsepower of the engine, this data is then decoded in decoder 28 and displayed in digital readout 29 which directly indicates the fuel (brake) horsepower of the engine at the tested load point.

The referenced data signal points are related to the basic fuel horsepower formula as follows: $D_1 = 1 \times 10^7$ Hz; $D_2 = 1 \times 10^7$/Engine Factor; $D_3 =$ Time Per Revolutions X (N) Revolutions; $D_4 = D_2/D_3$; and $D_5 =$ Meter Factor Period.

Figures 2, 2D:
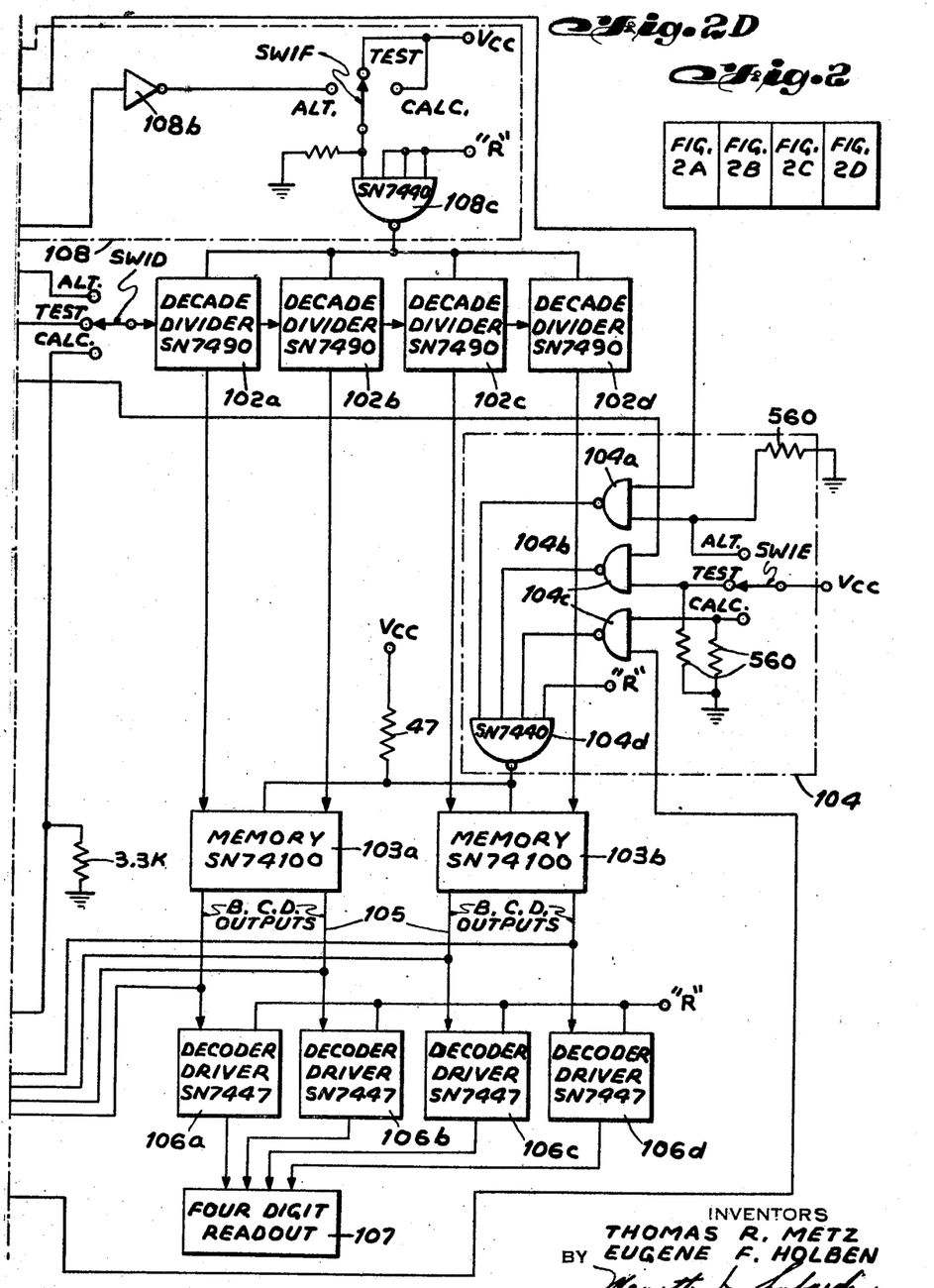
FIG. 2 illustrates the manner of organizing the drawings of FIGS. 2a—2d.
FIGS. 2a—2d illustrate in detail a preferred embodiment for implementing the computing arrangement described in connection with FIG. 1.
Figure 2A:
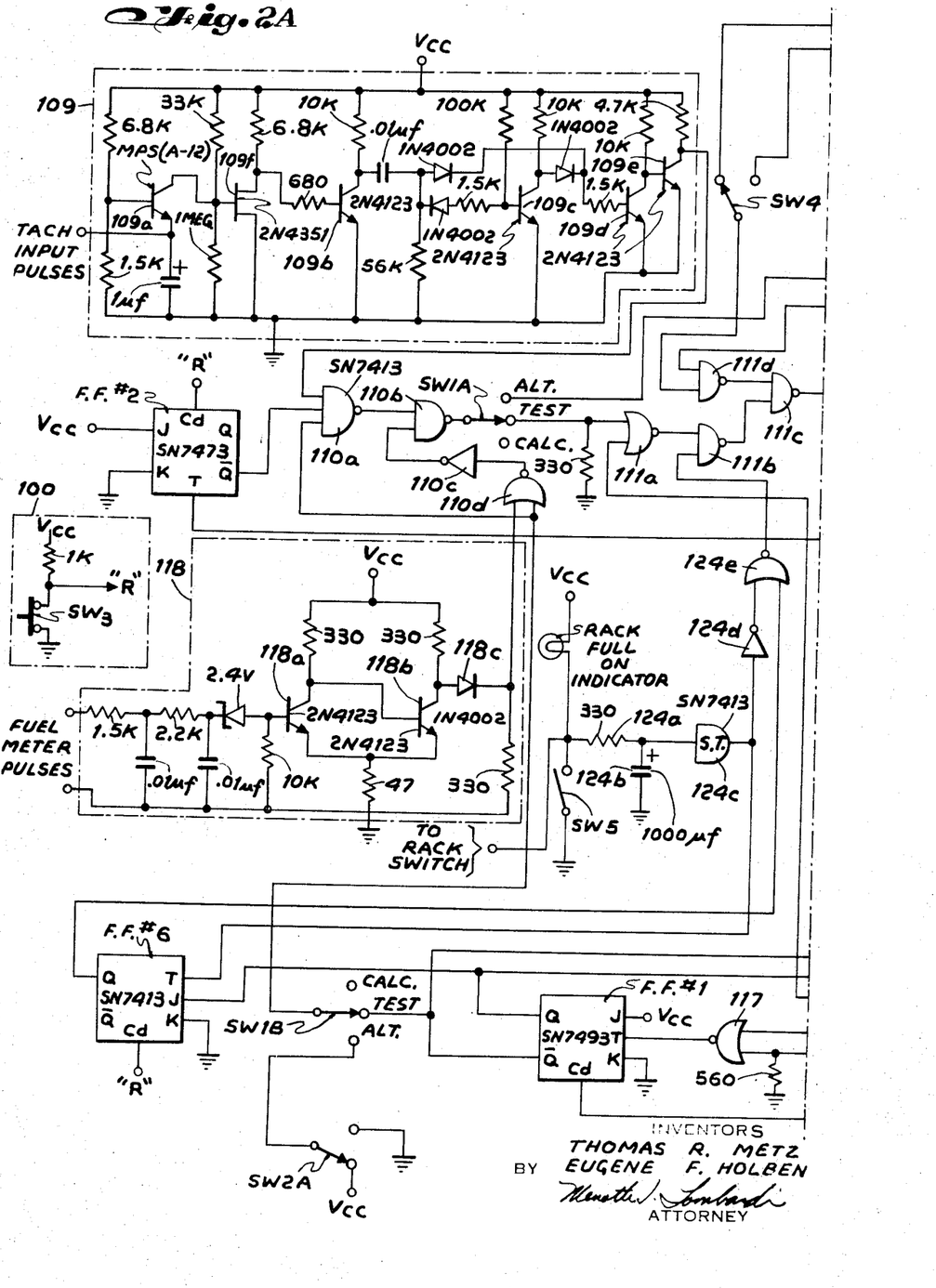
Figure 2B:
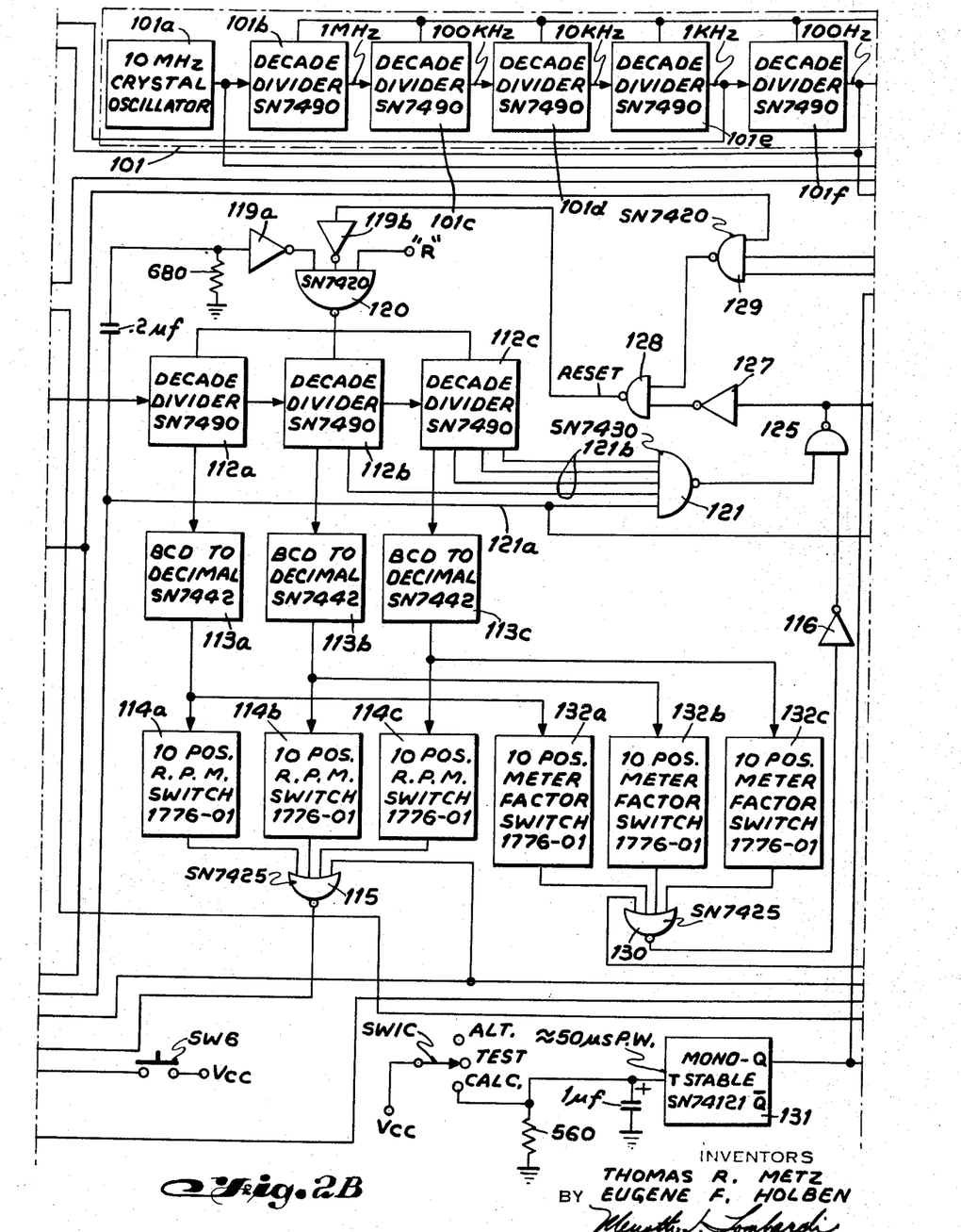
Figure 2C:
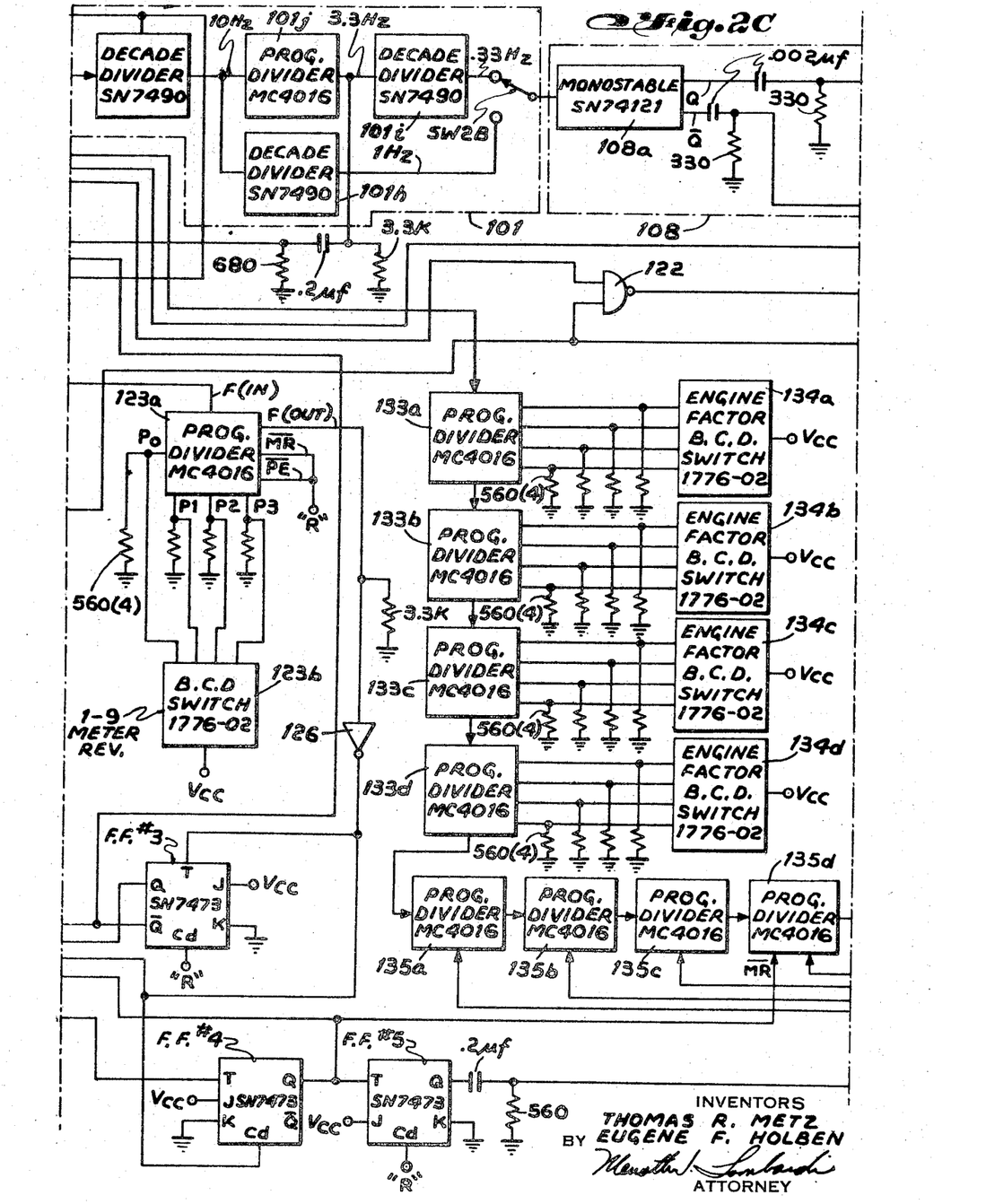

The computing arrangement illustrated and described in connection with the functional block diagram of FIG. 1 may be implemented by an embodiment described in connection with the following drawings, and in which FIG. 2 illustrates the manner of organizing the drawings of FIGS. 2a–2d.

Referring now to FIGS. 2a–2d, the following conditions apply to the illustrated preferred embodiment: (1) Switch SW1 sets alternate-test-calculate mode (shown in test position); (2) Switch SW2 to set for display of engine RPM or Meter hertz (shown in RPM position); (3) Switch SW3 is system reset switch; (4) Switch SW4 is type meter selector switch (for meter types DP-31-1448 or DP-40-1449), shown in position for DP-31-1448 meter; (5) Switch SW5 full load rack override switch; (6) Switch SW6 is RPM override switch; (7) All NAND gates are SN7400 unless noted; (8) All inverters are SN7404 unless noted; (9) All NOR gates are SN7402 unless noted; (10) Vcc is equal to +5.0 volts for the disclosed embodiment; and (11) The resistance values are in ohms.

A reset system in block 100 has a switch SW3 which connects to the voltage source and to all R inputs of the logic elements to clear the logic prior to initiation of a test cycle. A clock oscillator arrangement 101 includes a 10 mega-hertz crystal oscillator 101a, a plurality of decade dividers 101b—101i, and a divide by three divider 101j, the arrangement reduces the 10 mega-hertz signal to a 1 and 0.33 hertz signals at switch SW2. These signals are selectively coupled to the input of a following monostable.

Decade dividers 102a-102d function as the totalizing register and according to the switch settings of SW1D will serve to total pulses for the different modes of operation. The output from the dividers 102 is directly coupled to memory registers 103a and 103b. Switch gate 104 comprising switch SW1E and three mode NAND gates 104a, 104b, and 104c, whose outputs are coupled to NAND gate 104d which latches memories 103a and 103b at the proper time to store the last coupled readout from the dividers 102. The BCD outputs 105 of the memory are coupled to a decoder comprising decoder drivers 106a—106d. The outputs from the drivers are coupled to a four-digit readout 107 to directly indicate the value then stored in the memory 103.

It should be noted prior to further discussion of the operation, that this embodiment includes three modes of operation which depend on switch setting SW1. These modes include an alternate mode, a test mode and a calculate mode. Since the embodiment is primarily concerned with the test and calculate mode for directly indicating engine performance, the operation of the alternate mode will be briefly discussed first. With the SW1 switches set in the alternate mode, the engine RPM or the fuel meter input frequency in hertz may be read directly on the four-digit readout 107. The proper switch setting will enable input circuits in the alternate mode to accept either fuel input pulses or tachometer pulses, and by switch SW2 the proper timing. Switch SW2 is shown in the position to directly indicate engine RPM on the four-digit readout in the alternate mode. A reset timing circuit 108 for the dividers 102 is coupled to switch SW2. The timing circuit comprises a switch SW1F, a monostable 108a, an inverter 108b, and a NAND gate 108c in order that the proper timing and engineering units are incorporated for the four-digit readout 107. With this arrangement, when counting the fuel meter input pulses (in hertz), the count from the register divider 102 is transferred to the memory 103 every second as controlled by the timing circuit 108. Once the count is stored in the memory 102, as controlled by switch gating means 104, the register dividers 102a—102d are cleared by circuit 108 and the counting is again started from zero. Any count stored in memory 103 is then automatically decoded in decoding arrangement 106 and displayed in readout 107. When counting RPM tachometer input pulses, the dividers 102 are cleared every three seconds, and with this reset time, the readout will be in revolutions per minute.

With the system reset and the mode switch SW1 in the shown test position, flip-flop No. 1 is enabled and $\overline{Q}$ is at a logic one state and Q is in a logic zero. At this point, flip-flop No. 2 has $\overline{Q}$ at a logic one state. This enables the input gating so 10 tachometer pulses geared from a 20 pole tachometer are accepted per engine revolution. The input pulses are squared and doubled by tachometer input circuit 109 comprising transistors 109a—109e, and a FET 109f which are connected to provide 20 pulses per engine revolution to input gating NAND gate 110a. NAND gates 110a and 110b are serially connected and enabled by the incoming tachometer pulses, since by the set state of flip-flops No. 1 and No. 2, gate 110b is enabled by inverter 110c and gate 110d. The pulses are also coupled through NOR gate 111a, NAND gates 111b, 111c. Gate 111c is enabled by NAND gate 111d, coupled to flip-flop No. 4, and the 1 kilo-hertz clocking source. The gated input tachometer RPM pulses are coupled into the three decade dividers 112a, 112b and 112c having a normal reset time of 0.3 seconds with the parameters shown. The BCD output of the dividers 112 are coupled to BCD to decimal converters 113a, 113b and 113c, whose outputs are coupled to three ten-position RPM selector switches 114a, 114b and 114c. These selector switches are preset to the RPM at which the engine is to be tested. The least significant figure is omitted, i.e., for 1,900 RPM, the setting is 190. When the preset RPM is reached, NOR gate 115 will emit a pulse which is coupled through NOR gate 117 to toggle flip-flop No. 1. Override switch SW6 will also toggle flip-flop No. 1 if desired for test continuation. With flip-flop No 1 toggled, $\overline{Q}$ goes to logic zero and Q to logic one. This inhibits NAND gate 110a to prevent further entry of tachometer input pulses to the dividers 112. NOR gate 110d now couples fuel meter consumption input pulses into the dividers 112. The fuel meter input pulses are coupled by a fuel meter input circuit comprising a pair of collector-base coupled transistors 118a and 118b, and a coupling diode 118c which couples the pulses through gating 110, 111 to the dividers 112. In the meantime, the dividers 112 have been reset by flip-flop No. 1, Q being at a logic one, through inverter 119a and NAND gate 120. The $Q=1$ (of flip-flop No. 1) also sets, by line 121a, NAND gate 121. It should be noted that gate 121 is hard-wired to detect 720 BCD output pulses representing the count one meter revolution by lines 121b. The count 720 represents the pulses per one meter revolution of the particular type flow meter used. For other flow meters having different pulse counts per revolution, the NAND gate 121 can be modified or wired accordingly. The Q=1 (flip-flop No. 1) also enables NAND gate 122 to permit 100 hertz clock pulses to be coupled into the dividers 102, which now performs the function of a fuel totalizing register to count the time required for the meter to complete the set number of meter revolutions. The meter revolution selector arrangement includes divider 123a and BCD switch 123b which can be set from one to nine meter revolutions. The meter revolution must be completed before gate 122 is inhibited. Q=1 (flip-flop No. 1) also sets flip-flop No. 6 to control input of gate 111b.

Attached to the engine rack is a rack switch which must remain closed, or not open, for more than 0.2 seconds for the shown time constant provided by resistor 124a and capacitor 124b. Otherwise a signal through gates 124c, 124d, 124e will inhibit NAND gate 111b and prevent further test of the system. This is to insure that a rated or full load test at the indicated RPM may be completed, otherwise an inhibit pulse is generated to stop and to indicate that the test must be rerun. An indicator for rack full on gives a visual display, and is connected to switch SW5 which is an override switch to enable completion of a run without regard to the engine rack switch.

Once NAND gate 121 has sensed the 720 pulses, the output is gated through NAND gate 125 to program divider 123a and then to inverter 126 after the divider 123a has satisfied the BCD switch setting 123b. The output from gate 125 is also coupled through inverter 127 to NAND gate 128 which requires a gated input from NAND gate 129 to produce a reset pulse.

The output from inverter 126 clears flip-flop No. 1 which in turn inhibits gate 122 to prevent further timing pulses and latches memory 103 by enabling gate 104b to retain the time required to count the 720 pulses plus the programmed number of meter revolutions. This time is retained in memory 103a and 103b, and the BCD outputs are decoded in decoders 106 and the four-digit readout displays this time in hundredths of a second.

The output pulse from inverter 126 toggles flip-flop No. 3 setting $\bar{Q}$ to logic zero, enables NOR gate 130, and clears flip-flops No. 4 and No. 5 for the calculate mode. The foregoing test sequence of the arrangement may be summarized as follows, with the mode switch in the test position decade dividers count tachometer input pulses to indicate the preset RPM at which the engine performance is to be computed. A pulse output indicating the engine has reached the programmed RPM changes the input gating to allow fuel meter consumption input pulses into the dividers, and at the same time, a clocking signal is coupled to four decade dividers. When a BCD output of 720 pulses is counted and a programmed divider is satisfied, the logic is switched and further pulses from the clock source are inhibited from entering the four decade dividers and the last count is latched into the memory. The 100 hertz signal from the clock source is gated off and a reading of times in seconds is left in the memory. This time is decoded by decoders 106 and readout 107 displays the time in hundredths of a second and the time reading is also retained in the memory until required for calculation.

For calculation, switch SW1 is switched to the calculate mode. This operation causes dividers 102 to be reset, and gate 104c is set to receive the gating pulse from flip-flop No. 5. At this time monostable 131 is triggered to provide approximately a 50 microsecond width pulse and Q goes to logic one, causing the timing clock base to be reset to zero, and flip-flop No. 4 to be toggled on the trailing edge of the 50 microsecond pulse. The resetting of the time base to zero enables a synchronous starting count from zero for the calculation. A one kilo-hertz clock pulse is then coupled through gating 111d,c into dividers 112. The gating is controlled by flip-flop No. 4, Q at logic one. The dividers 112 are then coupled to the BCD to decimal converter 113, and the outputs from converters 113 are coupled to three ten-position meter factor switches 132a–132c. The meter factor switches are programmed to represent the K factor of the meter. For the particular meter of the example, DP-31-1448, this factor is 242, and for the DP-40-1449, this factor is 167. The factor represents the pound-second per revolution-hour of the meter. NOR gate 130, which was enabled by flip-flop No. 3, couples one pulse through inverter 116 and gate 125 into the program divider 123a acting as divide by N for the frequency signal proportional to meter displacement and then to inverter 126. The output from inverter 126 clears flip-flop No. 4. The output of gate 125 also resets dividers 112.

Ten mega-hertz clock pulses are coupled into dividers 133a—133d having associated therewith programmable BCD switches 134a—134d. The switch settings are set for the engine factor for a particular engine under test. This factor is equal to the pounds of fuel per brake horsepower-hour for the engine. The dividers divide the frequency of 10 mega-hertz by the engine factor and couple the output to time dividers 135a—135d. At the time the programmable dividers 135 couple the fuel horsepower pulses to the dividers 102 from the start of the calculation to the stop of divider 135d. With Q of flip-flop No. 1 at logic one, flip-flop No. 5 is set. The pulse from inverter 126 clears flip-flop No. 4, Q going to logic zero and programmable divider 135d is inhibited at input $\overline{MR}$. The clearing of flip-flop No. 4 also toggles flip-flop No. 5, Q becoming logic one, which latches memory 103a and 103b through gate 104c to hold last number coupled from dividers 102. The BCD output of this number is retained in memory and decoded. The decoded output is displayed in the four-digit readout 107 which directly indicates the fuel (brake) horsepower of the engine tested.

The foregoing description describes an engine computing arrangement in which a programmable network indicates, in response to a preset engine RPM, when the engine reaches the selected RPM. At this point, logic control means responsive allow clock timing pulses to be applied to a totalizing register while a programmed meter counting means senses a predetermined number of fuel consumption pulses. When the total number of pulses is sensed, further entry of clock time pulses into the totalizing register is prohibited, and this count is stored in a memory to be utilized during calculation of fuel horse-power. The calculating means includes a programmable meter factor generator and programmable frequency dividers, the calculating means is initialized and synchronized to a clock source and generates a fuel horsepower output pulses which are totalized and stored in the memory. The results are decoded and directly displayed in a digital readout following the completion of both the test and calculate cycle. After both cycles are completed, nothing further can be done until the system is reset.

While we have described above the principles of our invention in connection with specific apparatus, it is to be clearly understood that this description is made only by way of example and not as a limitation to the scope of the invention as set forth in the objects and features thereof and in the accompanying claims.

We claim:

1. A system for computing engine performance comprising:
 first means responsive to a source of engine RPM signals for detecting a selected engine RPM;
 second means responsive to a source of fuel consumption signals for registering and storing an indication of the quantity of fuel per unit time being consumed at said RPM;
 third means coupled to said first and second means to enable said second means when said first means detects said RPM; and
 fourth means coupled to said second and third means and programmed for computing the engine performance.

2. A system for determining the fuel horsepower of an engine
 means for generating a first pulse indicating a predetermined RPM of said engine;
 means for generating a second pulse representing a predetermined number of fuel consumption pulses;
 means to store the time to accumulate said predetermined number of fuel pulses; and
 means coupled to said storage means and programmed to calculate the fuel horsepower of said engine.

3. An engine computating arrangement comprising:
 a programmable RPM selector network to generate a pulse output when a predetermined engine RPM is reached;
 control and register means, said control means responsive to said output pulse to enable time pulses to be accumulated by said register;
 meter counting means responsive to a source of fuel pulses to sense a predetermined number of fuel pulses and to inhibit further time pulses from being accumulated by said register;
 storage means coupled to said register to store the accumulated time pulses; and
 programmable means coupled to said storage and register means for computing the fuel horsepower of said engine.

4. The arrangement of claim 3 including means coupled to said storage means for indicating the calculated fuel horsepower.

5. The computing arrangement of claim 3 wherein said computing means includes:
 a programmable meter factor generator means;
 first and second programmable frequency dividers, said first divider coupled to provide an input to said second divider; and
 a pulse multiplier means having inputs coupled from said programmable generator means and second frequency divider to couple fuel horsepower totalizing pulses to said register means.

6. The arrangement of claim 5 including a clock source and wherein said first programmable frequency divider provides a signal proportional to a clock signal input from said clock source divided by a programmed engine factor of the engine.

7. The arrangement of claim 6 wherein said second programmable frequency divider divides said proportional signal by the time stored in said storage means.

8. The arrangement of claim 7 wherein said programmable meter factor generator means produces in response to another clock signal input a displacement signal whose frequency is proportional to said fuel meter displacement.

9. The arrangement of claim 7 wherein said programmable meter factor generator is programmed to produce in response to another selected clock signal a displacement signal whose frequency is proportional to said fuel meter displacement.

10. The computing arrangement of claim 3 wherein said control means includes:
 a control flip-flop responsive to said programmable network and to said meter counting means; and
 a control gate coupled to one output of said control flip-flop to permit said time pulses to be coupled to said register.

11. The computing arrangement of claim 10 including switch gate means coupled to said one output of said control flip-flop and to said storage means to cause the storing of said timing pulses.

12. The computing arrangement of claim 3 including a source of engine tachometer pulses and input gating means to enable in one condition RPM input pulses from said engine tachometer source to be applied to said programmable RPM network, and in another condition to enable said input gating means to couple fuel meter input pulses to said meter counting means.

13. The computing arrangement of claim 12 wherein said meter counting means includes a meter revolution selector to produce an inhibit pulse when said fuel meter has completed a preset number of revolutions.

14. The computing arrangement of claim 3 wherein said control means further comprises:
 a control flip-flop responsive to said programmable network and to said meter counting means;
 a control gate coupled to one output of said control flip-flop to enable said timing pulses to be coupled to said totalizing register; and
 switch gate means coupled to said one output of said control flip-flop to enable storing in said storage means.

15. The computing arrangement of claim 14 including input gating means responsive to another output of said control flip-flop to permit in one condition RPM input pulses to be applied to said programmable network, and in another condition to enable said input gating means to couple fuel meter input pulses to said meter counting means.

16. The computing arrangement of claim 15 wherein said meter counting means includes a meter revolution selector programmed to produce said inhibit pulse when the predetermined number of pulses have been sensed.

17. The arrangement of claim 16 wherein said first programmable frequency divider provides a signal proportional to a selected clock signal divided by programmed engine factor of the engine.

18. The arrangement of claim 17 wherein said second programmable frequency divider divides said proportional signal by the time stored in said storage means.

19. A system for computing engine performance comprising:
- first means responsive to a source of engine RPM signals for detecting and generating a first signal indicating the RPM of an engine;
- second means responsive to a source of fuel consumption signals for determining the quantity of fuel per unit time being consumed by said engine;
- third means coupled to store a representation of the fuel consumed;
- fourth means coupled for controlling and timing the operation of said first, second, and third means; and
- fifth means programmed to utilize said stored representation and to compute the engine performance.

20. Portable apparatus for calculating fuel consumption of an engine comprising:
- means for generating a first pulse indicating a predetermined RPM of said engine;
- means for generating a second pulse representing a predetermined number of fuel consumption pulses;
- means to store the time to accumulate said fuel pulses; and
- means coupled to said storage means and programmed to calculate the fuel consumption of said engine at said predetermined RPM.

21. Engine performance computing arrangement comprising:
- a programmable network programmed to sense engine RPM input pulses and to generate a first pulse at a predetermined engine RPM;
- a clock source and a totalizing register;
- control means responsive to said first pulse to enable said clock source to couple timing pulses to said totalizing register;
- meter counting means programmed to sense a predetermined number of fuel meter input pulses and to inhibit further timing pulses into said register;
- storage means coupled to said register to store the accumulated timing pulses, said pulses representing the time required to sense said predetermined number of fuel input pulses;
- calculating means coupled to said storage and register means for computing the fuel horsepower of said engine; and
- decoding and display means coupled for displaying the computed fuel horsepower.

22. The computing arrangement of claim 15 wherein said calculating means includes:
- a programmable meter factor generator means;
- first and second programmable frequency dividers, said first divider coupled to provide an input to said second divider; and
- a pulse multiplier means responsive to said second frequency divider to couple pulses representing fuel horsepower to said register until stopped by an output from said meter generator means.

23. A method of engine performance analysis comprising:
- selecting a desired RPM at which the engine is to be analyzed;
- indicating when the selected RPM is reached;
- counting a predetermined number of fuel consumption pulses;
- totalizing and storing the time required to accumulate said pulses; and
- calculating the performance of said engine utilizing the stored time, and a meter and engine factor to form a quantity representing the fuel horsepower of said engine, according to the formula:

$$\text{fuel horsepower} = \frac{\text{meter factor} \times (N) \text{ revolutions}}{\text{engine factor} \times \text{time per revolutions} \times (N) \text{ revolutions}}$$

wherein the engine factor is equal to pounds of fuel per brake horsepower hour, and the meter factor is equal to pounds per gallon times gallons per revolution times seconds per hour.

24. The method according to claim 23 including the steps of:
- programming a meter factor number into said calculation; and
- programming a number into said calculation representing the engine factor of said engine.

25. A method for computing fuel horsepower of an engine comprising:
- selecting the engine RPM at which the computation is to be made;
- indicating when the selected RPM is reached; counting a predetermined number of fuel pulses representing fuel consumption at the selected RPM;
- registering and storing the time required to count said fuel pulses;
- computing the fuel horsepower of said engine utilizing said stored time and a meter and engine factor according to the formula:

$$\text{fuel horsepower} = \frac{\text{meter factor} \times (N) \text{ revolutions}}{\text{engine factor} \times \text{time per revolutions} \times (N) \text{ revolutions}}$$

wherein the engine factor is equal to pounds of fuel per brake horsepower hour, and the meter factor is equal to pounds per gallon times gallons per revolution times seconds per hour; and indicating the results of the computation.

26. The method according to claim 25 including the steps of:

programming a meter factor number into said calculation; and programming a number into said calculation representing the engine factor of said engine.

* * * * *